US012734828B2

(12) United States Patent
Sambhy et al.

(10) Patent No.: US 12,734,828 B2
(45) Date of Patent: Sep. 15, 2026

(54) SYSTEM AND METHOD FOR APPLYING PRIMER TO MEDIA IN INKJET PRINTERS

(71) Applicant: Xerox Corporation, Norwalk, CT (US)

(72) Inventors: Varun Sambhy, Pittsford, NY (US); Peter M. Gulvin, Webster, NY (US); Jason M. LeFevre, Penfield, NY (US); Seemit Praharaj, Webster, NY (US); Mark Petropoulos, Webster, NY (US); Anthony S. Condello, Webster, NY (US); Jorge A. Alvarez, Webster, NY (US); Douglas K. Herrmann, Webster, NY (US); Christine A. Steurrys, Williamson, NY (US); Palghat S. Ramesh, Pittsford, NY (US); Brian Lindstrom, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 148 days.

(21) Appl. No.: 18/444,646

(22) Filed: Feb. 17, 2024

(65) Prior Publication Data

US 2025/0262868 A1 Aug. 21, 2025

(51) Int. Cl.

*B41J 2/215* (2006.01)
*B41J 2/045* (2006.01)
*B41J 2/14* (2006.01)

(52) U.S. Cl.

CPC ........... *B41J 2/215* (2013.01); *B41J 2/04526* (2013.01); *B41J 2/04593* (2013.01); *B41J 2/14032* (2013.01)

(58) Field of Classification Search

CPC .......................... B41J 11/0015; B41J 11/0022; B41J 2/04526; B41J 2/04593; B41J 2/215; B41J 2/14032; B41J 2/01; B41J 2/02; B41J 2/135; B41J 2/14; B41J 2/14008; B41J 2/14016; B41J 2/14201; B41J 2/14314

See application file for complete search history.

(56) References Cited

U.S. PATENT DOCUMENTS

| | | | | |
|---|---|---|---|---|
| 6,554,389 | B1 * | 4/2003 | Hawkins | B41J 2/03 347/19 |
| 9,085,161 | B2 | 7/2015 | Gloster et al. | |
| 9,403,383 | B1 * | 8/2016 | Liu | B41J 11/00214 |
| 2023/0391078 | A1 * | 12/2023 | Shima | B41J 29/377 |
| 2024/0239101 | A1 * | 7/2024 | Horiguchi | B41J 2/02 |
| 2024/0295524 | A1 * | 9/2024 | Wang | G01N 27/3335 |

OTHER PUBLICATIONS

Canon Solutions America. Hello, I'm the New VarioPrint i-Series+, https://pps.csa.canon.com/sites/default/files/2023-04/Hello-Im-the-New-VarioPrint-i-series-plus-BR_0.pdf. Accessed Jan. 9, 2024.

* cited by examiner

*Primary Examiner* — Kristal Feggins

(74) *Attorney, Agent, or Firm* — Maginot Moore & Beck LLP

(57) ABSTRACT

An inkjet printer includes a nebulizer to generate a mist of primer and direct the mist onto media passing the nebulizer before the media is printed. A piezoelectric transducer is immersed in a primer solution and provided an alternating current to produce the mist. A pressure source directs the mist toward the passing media to apply the primer to the media.

20 Claims, 2 Drawing Sheets

SYSTEM AND METHOD FOR APPLYING PRIMER TO MEDIA IN INKJET PRINTERS

TECHNICAL FIELD

This disclosure relates generally to devices that produce ink images on media, and more particularly, to the application of primers to media in such printers prior to printing the media.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content that define the images. The actuators in the printheads respond to the firing signals by expanding into an ink chamber fluidly connected to a nozzle to eject ink drops from the nozzle onto an image receiving surface to form an ink image that corresponds to the digital image content used to generate the firing signals. The image receiving surface is usually a continuous web of media material or a series of media sheets.

Inkjet printers used for producing color images typically include multiple printhead modules. Each printhead module includes one or more printheads that typically eject a single color of ink. In a typical inkjet color printer, four printhead modules are positioned in a process direction with each printhead module ejecting a different color of ink. The four ink colors most frequently used are cyan, magenta, yellow, and black. The common nomenclature for such printers is CMYK color printers. Some CMYK color printers have two printhead modules that print each color of ink. The printhead modules that print the same color of ink are offset from each other by one-half of the distance between adjacent inkjets in the cross-process direction to double the number of pixels per inch to increase the density of a line of the color of ink ejected by the printheads in the two modules. As used in this document, the term "process direction" means the direction of movement of the image receiving surface as it passes the printheads in the printer and the term "cross-process direction" means a direction that is perpendicular to the process direction in the plane of the image receiving surface.

The image quality of aqueous ink images printed onto various types of media varies according to the type of media being printed. Image quality is typically excellent when the aqueous ink is printed onto offset coated, non-glossy media because the ink remains on top of the coating. Aqueous ink printing onto uncoated, porous media, however, produces washed out looking images because the inks are absorbed into the fibers of the paper. To avoid this consequence, coatings are applied to porous media to reduce the absorption of the inks into the media. As used in this document, the term "primer" means coatings that are applied to media to improve the image quality of the ink images over that which is achieved without the coatings. Primers reduce the interaction of the inks with the media since the primer is interposed between the media and the inks. Because the ink image is fixed to the primer layer rather than the media, the ink image can be more easily removed. The case of ink image removal from media is a significant factor in recycling printed media.

Primer is applied to coated media in one of two ways. In some printers, primer is applied to a roller, the roller is brought into contact with the media as the media passes the roller, and the primer is transferred to the media. The second method of applying primer uses a printhead that is fluidly coupled to a supply of primer and the printhead is operated in a manner similar to when the printhead is operated to eject ink drops onto media. The roller method is simpler than the printhead method but the printhead method enables only those areas where is to be ejected to be coated. Thus, the printhead method is more efficient.

These methods also present their own sets of problems. The roller method requires a bulky system that typically includes a receptacle for holding the primer, a supply roller that is immersed in the primer within the receptacle, and the application roller that contacts the supply roller to provide primer to the application roller before the application roller contacts the media sheets. Additionally, the primer in the receptacle can be contaminated with debris carried by the media and perhaps ink during duplex printing operations. The printhead method of primer application adds cost and complexity to the print system and airborne primer satellites produced by the primer printhead may land on the neighboring ink ejecting printheads. The primer satellites can precipitate pigments out of the ink in the nozzles of the ink ejecting printheads and result in catastrophic printhead failure. Thus, inkjet printers would benefit from being able to treat media with primers without needing to contact the media with rollers or to operate one or more printheads.

SUMMARY

A new color inkjet printer is configured to treat media with primers that are applied without a roller or printhead. The color inkjet printer includes at least one printhead; a media transport for moving a media sheet through a print zone opposite the at least one printhead in a process direction; and a primer applicator having: a nebulizer configured to generate a mist from a primer; and a pressure source configured to direct the generated mist toward media on the media transport before the media passes the at least one printhead.

A new primer applicator is configured to positioned before a print zone in the printer and treat media with primers that are applied without a roller or printhead. The primer applicator includes a nebulizer configured to generate a mist from a primer; and a pressure source configured to direct the generated mist toward passing media.

BRIEF DESCRIPTION OF THE DRAWINGS

The foregoing aspects and other features of a color inkjet printer and color inkjet printer operational method that is able to treat media with primers without using a roller or printhead are explained in the following description, taken in connection with the accompanying drawings.

DETAILED DESCRIPTION

Figure 1:
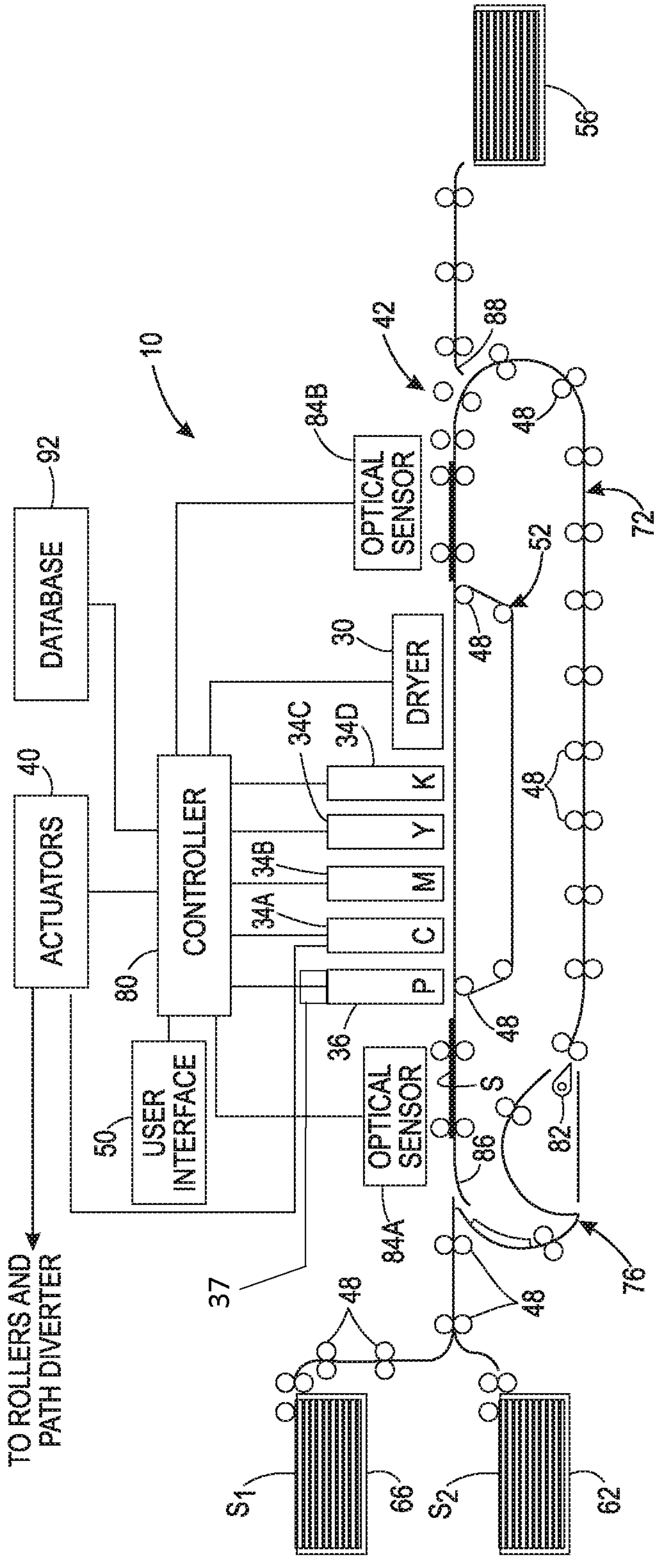
FIG. 1 is a schematic drawing of a color inkjet printer that is able to treat media with primers without using a roller or printhead.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

The inkjet printer described below coats media with a primer using an ultrasonic nebulizer to produce a primer mist that is directed onto the surface of the media. The primer, also referred to as a precoat composition, precoat, primer, or primer solution, is a metal salt solution that "crashes" or precipitates the pigments in the ink composition and prevents it from sinking or diffusing into the bulk of the media. The use of a metal salt solution as a primer has several advantages, including low material cost and the ability to improve print quality on both coated and uncoated paper. The effect of "crashing," precipitating, or causing the precipitation of a component of an ink can include any single chemical or combination of chemicals in relation to a printing ink or other printing related fluid that can facilitate the precipitation of one or more components in the ink. This precipitation is thought to be caused by component associations induced by a combination of the primer and/or component associations occurring with the primer.

Exemplary primers can be made with reference to the following table:

Representative Primer Solution

| Chemical | Amt (g) | % by Wt | Percentage Range |
|---|---|---|---|
| Glycerol | 21.8 | 2.2 | 0-5 |
| Propylene Glycol, (but can also include other cosolvents like butanediol, pentanediol, hexanediol, glycol ethers like Diethylene Glycol Monoethyl Ether, Dipropylene Glycol Methyl Ether and other cosolvents present in ink) | 197.7 | 19.8 | 10-40 |
| Water | 509 | 50.9 | 30-70 |
| Magnesium Nitrate Hexahydrate (but could also include other Ca or Al salts) | 270 | 27.0 | 10-50 |
| Surfactant TT4000 (surfactants will similar characteristics can be used) | 7 | 0.7 | 0.1-3 |
| Biocide Proxel | 1.45 | 0.1 | 0.1-1 |
| | 1006.95 | 100.7 | |

Such primers are not adhesives, sealers, suspensions, or the like that have been previously used in inkjet printers to treat media prior to printing.

FIG. 1 depicts a high-speed color inkjet printer 10 that uses an ultrasonic nebulizer to apply primer to media sheets in the printer before the media are printed. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads or a linear array of printheads that abut one another to enable media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

With further reference to FIG. 1, the printed image exits the print zone of printer 10 and passes under an image dryer 30 after the ink image is printed on a sheet S. As used in this document, the term "print zone" means an area of a media transport opposite the printheads of an inkjet printer. The image dryer 30 can include an infrared heater, a heated air blower, air returns, or combinations of these components to heat the ink image and at least partially fix an ink image to the sheet S. An infrared heater applies infrared heat to the printed image on the surface of the sheet S to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Prior to reaching the print zone, the media passes beneath a nebulizer 36. The nebulizer 36 includes a transducer that is immersed in a primer. In some embodiments, the transducer is piezoelectric transducer that vibrates at ultrasonic frequencies to produce a mist of primer droplets and these droplets are pushed through a slit or duct by a pressure source. This mist contacts the passing media to coat the media with the primer. The operation of the module 36 is described in more detail below. As used in this document, the term "transducer" means a device that converts electrical energy into mechanical vibrations.

A return path 72 is provided to receive a sheet from the media transport 42 after a substrate has been completely or partially printed and passed through the dryer 30. The sheet is moved by the rotation of pulleys in a direction opposite to the direction of movement in the process direction past the printheads. An actuator 40 operatively connected to pivot 88 is operated by the controller 80 to either block entry to the return path 72 and direct the media to the receptacle 56 or direct the media to the return path 72. At position 76, the substrates on the return path 72 can either be turned over so they can merge into the job stream being carried by the media transport 42 and the opposite side of the media sheet can be printed or left as they are so the printed side of the sheet can be printed again. To leave the sheets as they are, the controller 80 operates an actuator to turn pivot 82 counterclockwise from the position shown in the figure so the sheets bypass the bend in the return path and are directed to position 76 without being turned over. Thus, the printed side of the sheet can be printed. If the controller 80 operates the actuator to turn pivot 82 clockwise to the position depicted in the figure, then the sheet goes over the bend and is flipped before being returned to the transport path 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84B. The optical sensor 84B generates image data of the printed sheets and this image data is analyzed by the controller 80 to detect streakiness in the printed images on the media sheets of a print job. Additionally, sheets that are printed with test pattern images are printed at intervals during the print job. Image data of these test pattern images generated by optical sensor 84B are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the correct mass or landing at an errant position is called an inoperative inkjet in this document. The controller can store data identifying the inoperative inkjets in database 92 operatively connected to the controller 80. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. For sheets that are not inverted and merged into the job stream by the operation of pivoting member 86, optical sensor 84A generates image data of the printed side and the controller 80 uses that image data to register the sheets and to operate the ejectors in the printhead to further print images on the previously printed sheet sides. The optical sensors 84A and 84B can be a digital camera, an array of LEDs and photodetectors, or other devices configured to generate image data of a passing surface. While FIG. 1 shows the printed sheets as being collected in the sheet receptacle 56, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the nebulizer 36 (and thus the switch 37) and printhead modules 34A-34D (and thus the printheads), the detector 38, the actuators 40, and the image dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the controller 80 reads, captures, prepares, and manages the image data flow between image input sources, such as a scanning system or an online or a work station connection (not shown), and the nebulizer 36 and printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory, computer readable medium associated with the processors or controllers. The processors, their memories, and interface circuitry configure the controllers to perform the operations described below when the programmed instructions are executed. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the nebulizer 36 and printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Figure 2:
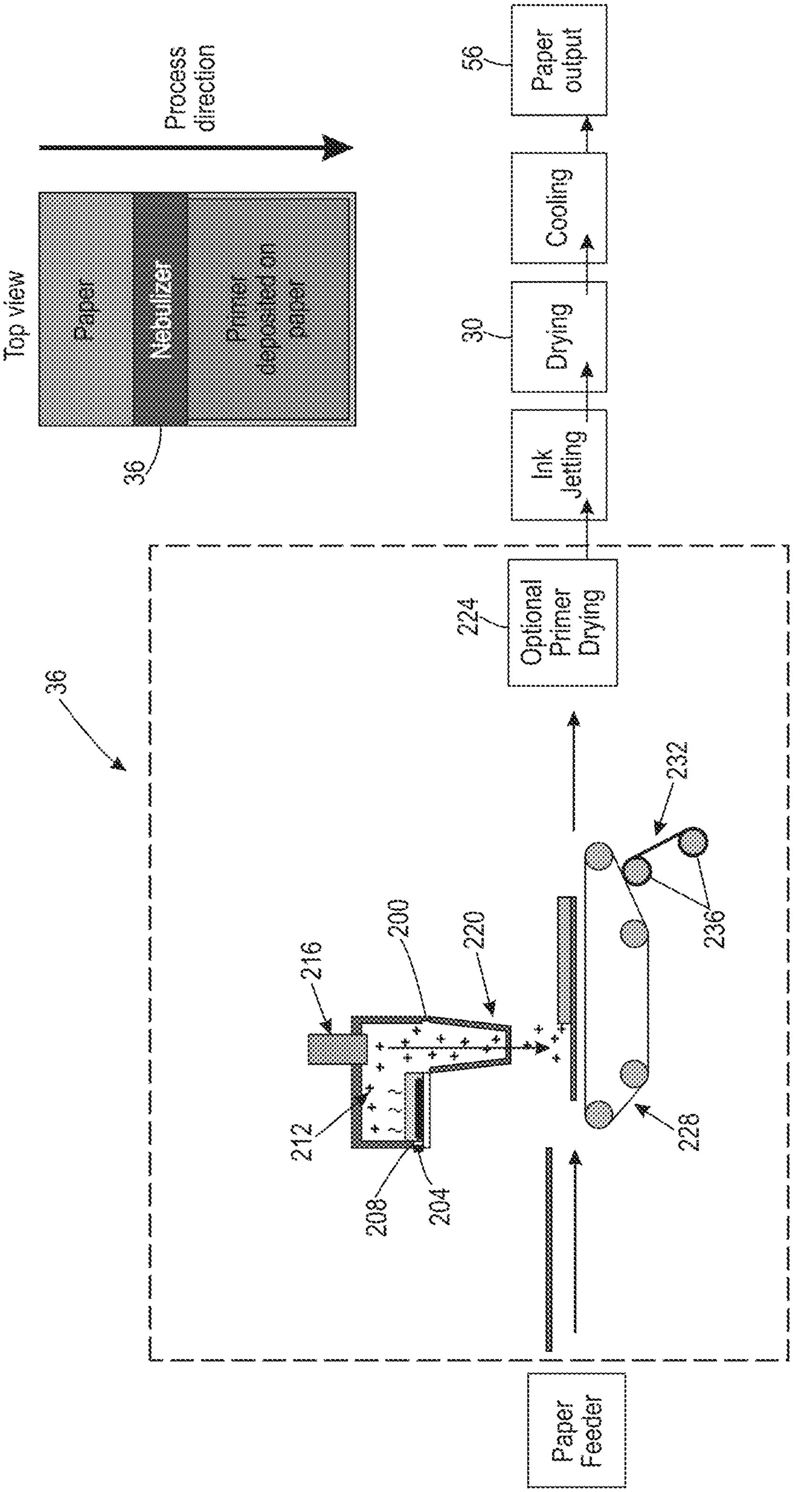
FIG. 2 is a side view of the primer applicator in the printer of FIG. 1.

The details of the nebulizer 36 are shown in more detail in FIG. 2. As used in this document, the term "nebulizer" means a device that produces a mist from a liquid. A housing 200 contains a receptacle 208 that has a porous or open upper surface and a transducer 204 within it. The receptacle 208 holds a volume of primer. The controller is operatively connected to the transducer 204 of the nebulizer 36 to operate a switch 37 (e.g., a relay) and provide an alternating current to the transducer 204. The transducer 204 converts the electrical current into mechanical vibrations that nebulize the primer to produce a mist 212 within the housing 200. Accordingly, the controller 80 is configured to control the switch 37 and adjust the frequency and amplitude of the alternating current provided to the transducer 204 and thereby adjust the size of droplets in the generated mist 212. Pressure source 216 directs the primer mist through an opening or slit 220 in the housing so the primer mist contacts the media passing by the slit. The pressure source 216 can be a fan or other pressurized air source, such as compressed air. In some embodiments, a dryer 224 is provided to at least partially evaporate water from the primer before the primer coated media enters the print zone opposite the printheads. Because the media sheets have a gap between them, the conveyor belt 228 carrying the media sheets is also exposed to the primer mist. To attenuate the build-up of primer on the belt, an indexed cleaning belt 232 is provided to contact the belt and absorb the primer from the belt. From time to time, the controller 80 operates an actuator 40 to rotate one or both of the pulleys 236 to take up a portion of the cleaning belt 232 and provide fresh cleaning belt for contacting the conveyor belt 228.

The transducer 204 can be a stepped horn or ceramic disc. The primer is dispersed into the receptacle so the transducer is immersed in the primer and the mechanical energy produced by the transducer is dispersed into the primer. Droplets separate from the surface of the liquid and enter into the open volume in the housing. Droplet size within the mist is a function of the frequency of the mechanical energy input. Specifically, the droplets become smaller as the frequency increases corresponding to the equation:

$$\text{Mean Diameter of Liquid Droplets}=0.73\sqrt{}^{3}([\text{Surface Tension of Liquid}]/([\text{Density of Liquid}]\times[\text{Frequency of Input Signal}]^{2})).$$

Additionally, adjusting the primer solution to alter its physical characteristics such as surface tension and density and controlling the alternating current frequency and amplitude provided to the transducer can optimize the mist and minimize large droplet splatter. In some embodiments, the primer solution consists of water (70%), glycerol (21%) and cations, such as Mg+, Ca+, or the like (9%).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:
at least one printhead;
a media transport for moving a media sheet through a print zone opposite the at least one printhead in a process direction; and
a primer applicator having:
a nebulizer configured to generate a mist from a primer; and
a pressure source configured to direct the generated mist toward media on the media transport before the media passes the at least one printhead;
a housing in which the nebulizer is positioned; and
an opening in the housing to which the pressure source directs the generated mist.

2. The inkjet printer of claim 1 wherein the nebulizer is a transducer immersed in a metal salt solution.

3. The inkjet printer of claim 2 wherein the transducer is an ultrasonic transducer.

4. The inkjet printer of claim 1 wherein the opening in the housing is a slit.

5. An inkjet printer comprising:
at least one printhead;
a media transport for moving a media sheet through a print zone opposite the at least one printhead in a process direction; and
a primer applicator having:
a nebulizer comprising an ultrasonic transducer configured to generate a mist from a primer; and
a pressure source configured to direct the generated mist toward media on the media transport before the media passes the at least one printhead.

6. The inkjet printer of claim 5 wherein the pressure source is a fan.

7. The inkjet printer of claim 5 wherein the pressure source is compressed air.

8. The inkjet printer of claim 5 further comprising:
a controller operatively connected to a switch connected to the ultrasonic transducer, the controller being configured to operate the switch to provide an alternating current to the ultrasonic transducer.

9. The inkjet printer of claim 8, the controller being further configured to:
alter the alternating current to adjust a size of droplets in the generated mist.

10. The inkjet printer of claim 9, the controller being further configured to:
alter one of a frequency and an amplitude of the alternating current to adjust the size of droplets in the generated mist.

11. The inkjet printer of claim 5 wherein the ultrasonic transducer is immersed in a metal salt solution.

12. A primer applicator for an inkjet printer comprising at least one printhead and a media transport for moving a media sheet through a print zone opposite the at least one printhead in a process direction, the primer applicator comprising:
a nebulizer configured to generate a mist from a primer;
a pressure source configured to direct the generated mist toward passing media;
a housing in which the nebulizer is positioned; and
an opening in the housing to which the pressure source directs the generated mist.

13. The primer applicator of claim 12 wherein the nebulizer is a transducer immersed in a metal salt solution.

14. The primer applicator of claim 13 wherein the transducer is an ultrasonic transducer.

15. The primer applicator of claim 14 wherein the pressure source is a fan.

16. The primer applicator of claim 14 wherein the pressure source is compressed air.

17. The primer applicator of claim 14 wherein the opening in the housing is a slit.

18. The primer applicator of claim 14 further comprising:
a controller operatively connected to a switch, the controller being configured to operate the switch to provide an alternating current to the ultrasonic transducer.

19. The primer applicator of claim 18, the controller being further configured to:
alter the alternating current to adjust a size of droplets in the generated mist.

20. The primer applicator of claim 19, the controller being further configured to:
alter one of a frequency and an amplitude of the alternating current to adjust the size of droplets in the generated mist.

* * * * *